(12) United States Patent
Basfar et al.

(10) Patent No.: US 8,586,665 B2
(45) Date of Patent: Nov. 19, 2013

(54) CLEAN FLAME RETARDANT COMPOSITIONS WITH CARBON NANO TUBE FOR ENHANCING MECHANICAL PROPERTIES FOR INSULATION OF WIRE AND CABLE

(71) Applicant: King Abdulaziz City Science and Technology, Riyadh (SA)

(72) Inventors: Ahmed Ali Basfar, Riyadh (SA); Hun Jai Bae, Ontario (CA)

(73) Assignee: King Abdulaziz City Science and Technology, Riyadh (SA)

( * ) Notice: Subject to any disclaimer, the term of this patent is extended or adjusted under 35 U.S.C. 154(b) by 0 days.

(21) Appl. No.: 13/716,242

(22) Filed: Dec. 17, 2012

(65) Prior Publication Data

US 2013/0178572 A1   Jul. 11, 2013

Related U.S. Application Data

(62) Division of application No. 12/684,139, filed on Jan. 8, 2010.

(51) Int. Cl.
| | |
|---|---|
| C08L 31/02 | (2006.01) |
| C08L 23/06 | (2006.01) |
| C08L 9/00 | (2006.01) |
| C08L 33/06 | (2006.01) |
| C08K 3/04 | (2006.01) |
| C08K 3/22 | (2006.01) |
| C08K 3/26 | (2006.01) |
| C08K 3/32 | (2006.01) |
| C08K 3/38 | (2006.01) |
| C08K 3/10 | (2006.01) |
| C04B 26/06 | (2006.01) |

(52) U.S. Cl.
   USPC ........... 524/563; 524/586; 524/570; 524/574; 524/496; 524/437; 524/436; 524/414; 524/405; 524/406; 525/55

(58) Field of Classification Search
   USPC ......... 524/563, 586, 570, 574, 496, 437, 436, 524/414, 405, 406; 525/55
   See application file for complete search history.

(56) References Cited

FOREIGN PATENT DOCUMENTS

WO   WO 2009/119942   * 10/2009

* cited by examiner

Primary Examiner — William Cheung
(74) Attorney, Agent, or Firm — Raj Abhyanker, P.C.

(57) ABSTRACT

Commercial thermoplastic clean flame retardant materials in wire and cable insulation are mechanically unstable due to high filler loading. In the present invention, thermoplastic, black color, clean flame retardant composition using carbon nano tubes (CNT) is made. The resultant compositions possess very low smoke and toxicity. CNT with outer diameter of 40-60 nm and length of under 20 μm are used to increase mechanical properties and flame retardancy. Thermo plastically extruded composition consists of each component by parts by weight as follows: 100 of resin (polyolefin or 100 of polyolefin/ethylene propylene diene monomer (EPDM)), 90-150 of non-halogen containing flame retardants, 1-20 of auxiliary secondary flame retardant agents, 2-4 of CNT (outer diameter of 40-60 nm) and length under 20 μm and 0.2-1.0 of antioxidants. A reliable method for producing thermoplastic black color clean flame retardant insulation material for wire and cable without deterioration of mechanical properties is discussed.

4 Claims, 7 Drawing Sheets

CLEAN FLAME RETARDANT COMPOSITIONS WITH CARBON NANO TUBE FOR ENHANCING MECHANICAL PROPERTIES FOR INSULATION OF WIRE AND CABLE

CLAIM OF PRIORITY

This application is a divisional application and claims priority of U.S. patent application Ser. No. 12/684,139 titled CLEAN FLAME RETARDANT COMPOSITIONS WITH CARBON NANO TUBE FOR ENCHANCING MECHANICAL PROPERTIES FOR INSULATION OF WIRE AND CABLE filed on Jan. 8, 2010.

FIELD OF INVENTION

This disclosure generally relates to non-toxic, halogen free thermoplastic flame retardant composition containing carbon nano tube (CNT) as insulating material for wire and cable. More particularly, this invention relates to clean flame retardant compositions for increasing flame retardancy without deterioration of mechanical properties.

BACKGROUND

Every year, the world faces huge losses in lives and property due to residential and commercial fires caused by, electrical wiring. Human lives can be lost due to high temperature flames, toxic smoke and gas that are generated from the flammable insulation materials used in wire and cable during fire.

The current population uses many equipment and gadgets that contain several wires and cables. Most wires and cables are fabricated from plastic materials that are readily flammable. Moreover, modern living involves heavy use of electric equipment containing wires and communication systems made of cables. These conditions further increase the loss of lives and properties due to bad insulation of a wire or a cable resulting in an electrical fire. Smoke and toxic fumes from poor insulation materials in wires and cables can cause irreparable health damage.

Wire and cable insulations are required to meet not only the electrical properties but also the mechanical properties. Polyethylene and polyvinylchloride compounds are some of the best materials suitable for wire and cable insulations because of their excellent electrical and mechanical properties. However, these materials have poor flame retardancy and generate toxic gases during a fire.

Polyethylene, for example, is easily flammable and generates less toxic gases during the burning process. On the other hand, Polyvinylchloride compounds generate a lot of toxic gases during a fire, even though it has acceptable flame retardancy. Currently, clean flame retardant materials are made from special formulations. These special formulations are made of halogen and toxicity free chemicals. Clean flame retardant materials mainly consist of matrix polymers that do not contain halogen, main flame retardants, secondary flame retardants, intumescent flame retardants, processing aids and antioxidants. (Mans V et al. 1998, Rai M et al. 1998, Wei P et al. 2006 and Luciana R et al. 2005). The resultant mixture has very poor mechanical properties.

The other biggest problem with commercially clean material is that they have unstable mechanical properties, even though they possess high flame retardancy, due to high filler loadings. Clean flame retardant materials contain relatively high content of inorganic materials as flame retardants. In general, high levels of flame retardants are necessary to achieve commercially acceptable flame retardancy levels for wires and cables. However, high levels of flame retardants may lead to deterioration of mechanical properties. Insulation and jacket materials for wire and cable should meet appropriate standards for tensile strength, elongation at break, thermal resistance and flame retardancy for an extended application time. Enhanced cable insulations must also meet IEC 60502, BS 6724 and BS 7655 standards specific for thermoplastic compound requirements.

EVA(ethylene vinyl acetate), EVA/LDPE (low density polyethylene) (or LLDPE (linear LDPE), ethylene alpha olefin or ethylene ethyl acrylate are widely used as matrix polymer because of their high flame retardant load ability and increased flame retardancy. Main flame retardants mostly comprise of inorganic materials, such as, aluminum trihydroixide (ATH), magnesium hydroxide (MH) and huntite hydromagnesite (HH). They exhibit high decomposition temperature and have the ability to suppress smoke as clean flame retardant materials. However, more than 50% w/w loading is required to achieve the target flame retardancy. Unfortunately, such high contents of flame retardants can lead to interfacial problems between matrix polymer and flame retardants and then, can negatively affect the mechanical properties.

Various studies were performed to improve mechanical properties and flame retardancy by using organic encapsulated flame retardants (Chang et al. 2006, Du L et al. 2006, Liu Y et al. 2006), and synergistic effect of hydrotalcite with two flame retardants and organo-modified montmorillonite (Laoutid F et al. 2006, Ma H et al. 2006).

Organic encapsulated flame retardants can enhance the interfacial adhesion with matrix polymers and lead to improved dispersion compared to non-encapsulated flame retardants. Hydrotalcite composites increase flame retardancy by releasing more gas compared to other flame retardants during burning. In addition, partial substitution of flame retardants by organo-modified montmorillonite improves the burning properties. All these result only in improved flame retardancy.

Specification standards for wire and cable insulation composition require high flame retardancy and superior mechanical properties. For example, the minimum required tensile strength is 8.8 MPa and minimum elongation at break is 125% based on IEC 60502, BS 6724 and BS 7655 standards for thermoplastic compounds. Moreover, additional treatment of flame retardants or mixing with special chemicals increase cost performance of final products. There is a need to obtain a wire and cable insulation material that contains a clean flame retardant material, has superior mechanical properties and high flame retardancy. Without meeting these important properties, the clean flame retardant materials are not suitable for wire and cable insulation purposes.

SUMMARY

The current invention is carried out to find a flame retardant material which does not generate toxic gases for wire and cable insulation materials during a fire. The flame retardant materials are known as halogen free flame retardant compounds (HFFR compounds), clean flame retardant materials and/or non-toxic flame retardant materials.

The current invention relates to thermoplastic (not thermosetting) type clean flame retardant materials for wire and cable. The current invention pertains to unique formulations and processing methods of clean flame retardant materials of wire and cable. Partially crosslinkable clean flame retardant compositions, which can be partially crosslinked by routine thermoplastic extruder without using post curing systems, are described. The current invention of clean flame retardant compositions are particularly suitable for use in enhanced cable insulations to meet the requirement of thermoplastic compound standards.

In general, polymer parts in clean flame retardant compositions are under 50% by weight and flame retardants parts are over 50% by weight. Moreover, the particle size of most flame retardants used in clean flame retardant materials is under 50 μm, which enables excellent dispersion of polymer/flame retardants/Carbon Nano Tube (CNT) in the composition. Therefore, at first, three different types of multi-walled CNT with different diameter range for e.g. 10-15 nm, 40-60 nm and 60-80 nm are investigated to establish better compatibility with the other materials in thermoplastic clean flame retardant compositions. It was found that CNT with outer diameter of 40-60 nm and length distribution under 20 μm may show improved results in terms of mechanical properties and flame retardancy. Hence, CNT can be used in thermoplastic clean flame retardant compositions instead of carbon black to improve mechanical properties and flame retardancy.

The instant composition is processed by routine thermoplastic extruder and may show improved mechanical properties and flame retardancy. Composition mainly comprises of 100 parts by weight of resin (polyolefin or 100 parts by weight of polyolefin/ethylene propylene diene monomer (EPDM)), 90-150 parts by weight of non-halogen content main flame retardants, 1-20 parts by weight of auxiliary secondary flame retardant agents, 2-4 parts by weight with CNT of outer diameter of 40-60 nm and length distribution of under 20 μm and 0.2-1.0 parts by weight of antioxidants. The present invention demonstrates a reliable method of producing black color clean flame retardant insulation material for wires and cables. The said composition also possesses a high flame retardancy and meets the specification standard for mechanical properties as an insulation material for wires and cables.

BRIEF DESCRIPTION OF THE FIGURES

Example embodiments are illustrated by way of example and not limitation in the figures of accompanying drawings.

DETAILED DESCRIPTION OF THE FIGURES

Figure 1:
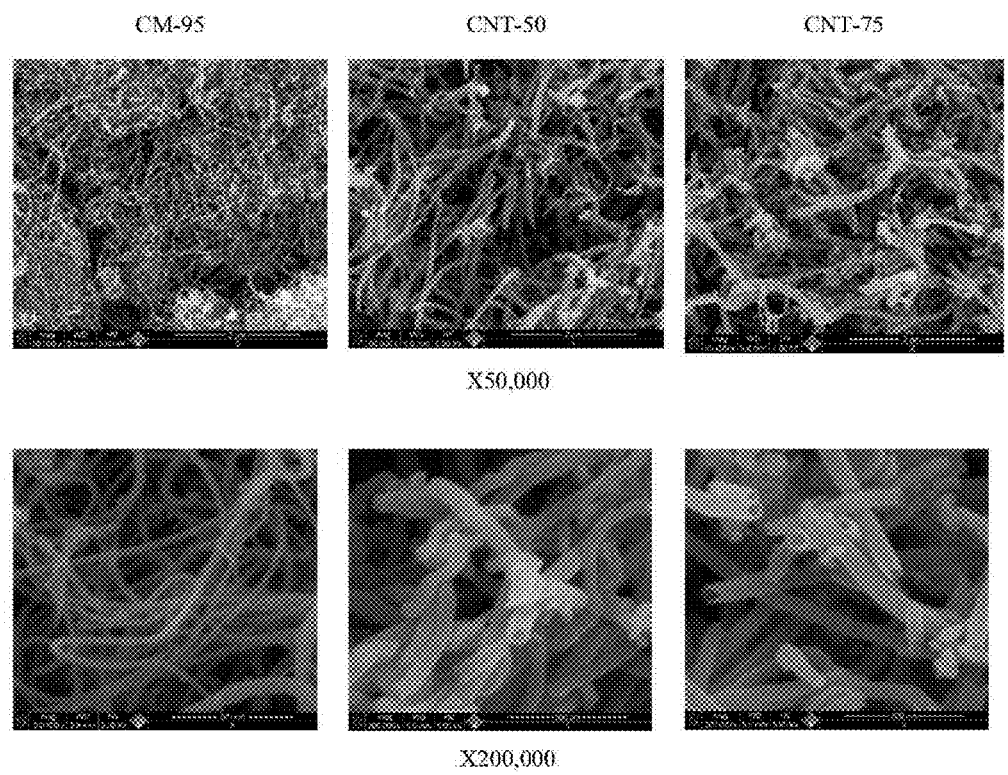
FIG. 1 illustrates EDAX micrographs of CNTs that are taken by EDAX system, Model NNL200 from FEI Company, Netherlands.

FIG. 1 shows CNT with different diameter sizes and tube lengths are investigated to find compatibility with the other components in thermoplastic clean flame retardant compositions. CM-95 (Hanwha nanotech/Korea, multi-walled CNT synthesized by catalytic CVD process, diameter range: 10-15 nm), CNT 50 (NanoKarbon, Korea nano Ind. Co., multi-walled CNT synthesized by catalytic CVD process, inner diameter: 10-30 nm, outer diameter: 40-60 nm, length distribution: under 20 μm) and CNT 75 (NanoKarbon, Korea nano Ind. Co., multi-walled carbon nanotubes synthesized by catalytic CVD process, inner diameter: 30-50 nm, outer diameter: 60-80 nm, length distribution: under 20 μm) are investigated for finding better compatibility with the other components.

Figure 2:
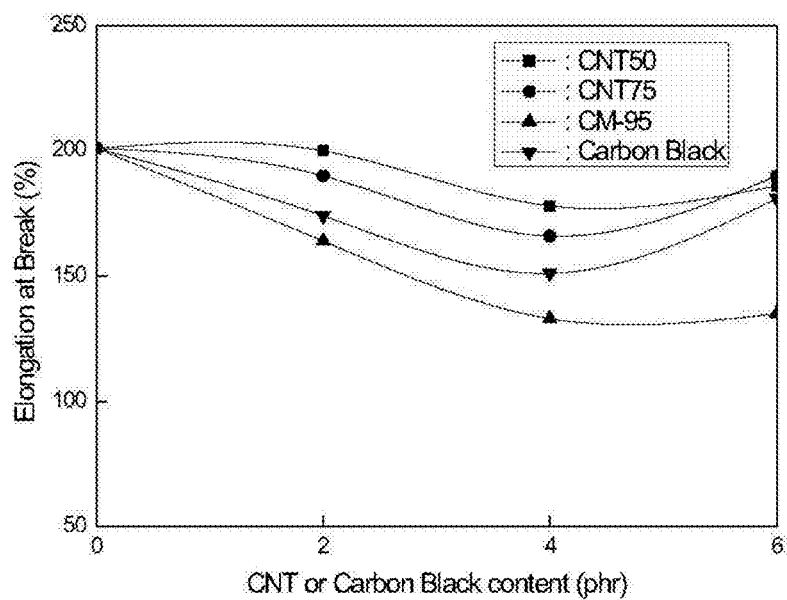
FIG. 2 illustrates elongation at break of ethylene vinyl acetate (Evaflex 360)/120 phr magnesium hydroxide (MAGNIFIN A Grades H10A) formulations as a function of CNT or carbon black content.
Figure 3:
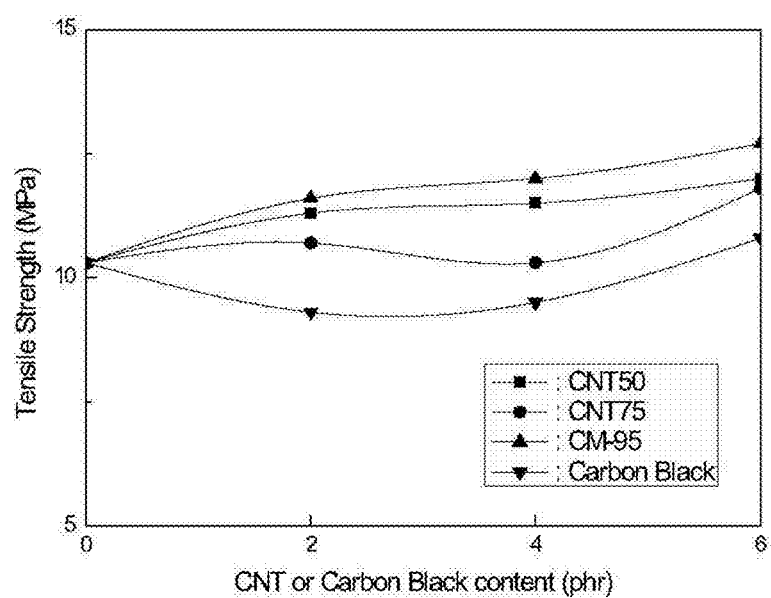
FIG. 3 illustrates tensile strength of ethylene vinyl acetate (Evaflex 360)/120 phr magnesium hydroxide (MAGNIFIN A Grades H10A) formulations as a function of CNT or carbon black content.
Figure 4:
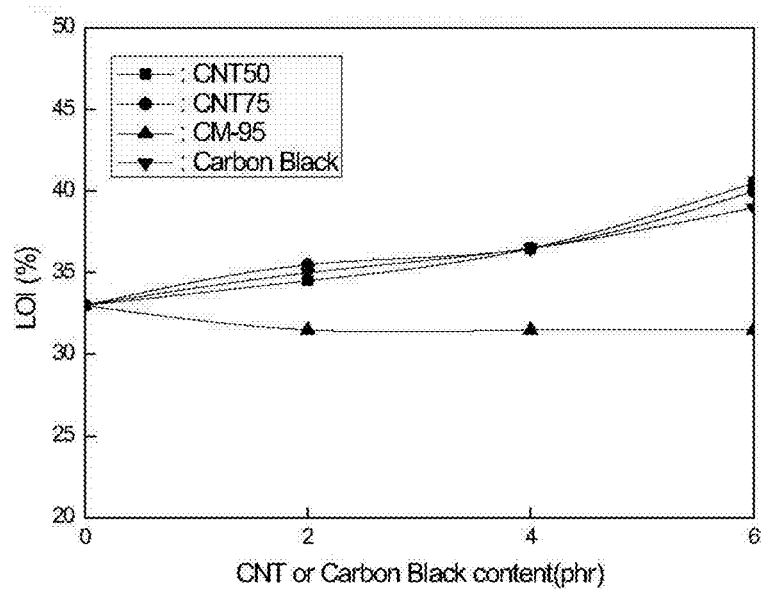
FIG. 4 illustrates LOI (%) of ethylene vinyl acetate (Evaflex 360)/120 phr magnesium hydroxide (MAGNIFIN A Grades H10A) formulations as a function of CNT or carbon black content.

As preliminary test, a comparison between CNT and carbon black in EVA/MAGNIFIN A Grades H10A formulations is conducted as shown in FIGS. 2, 3 and 4. Elongation at break (%) of EVA/120 phr H10A formulations as a function of CNT or carbon black content is shown in FIG. 2. Apparently different trends are observed from different CNTs even the content is quite small. At the range of up to 4 phr content, elongation at break decreases with increase of CNT content. CM-95 shows the lowest elongation at break even compared to carbon black. It is considered that the mechanical properties depend on the size of particle. When only CNT50/CNT75 formulations and CB contained formulations are compared in elongation at break, it is apparent that CNT50/CNT75 formulations show higher values than CB contained formulations. From the results, it is considered that CNT50/CNT75 can be used in HFFR formulations instead of CB for obtaining higher elongation at break values.

Tensile strength of EVA/120 phr H10A formulations as a function of CNT or CB content is shown in FIG. 3. Apparently different trends are observed from different CNTs even at small contents. At the range of up to 6 phr content, tensile strength increases with increase of CNT content. CM-95 shows the highest tensile strength even compared to CB contained formulations. It is proposed that smaller size of particles shows higher tensile strength, therefore, CM-95 shows the highest tensile strength and CB shows the lowest tensile strength. When only CNT50/CNT75 formulations and CB contained formulation are compared in terms of tensile strength, it is found that CNT50/CNT75 formulations show much higher values than CB contained formulations.

From the results of FIGS. 2 and 3, it is apparent that CNT50/CNT75 formulations show higher values than CB contained formulations in both mechanical properties (elongation at break and tensile strength). Therefore, it is considered that CNT50/CNT75 can be used in HFFR formulations instead of CB for obtaining higher mechanical properties (elongation at break and tensile strength).

LOI (%) of EVA/120 phr H10A formulations as a function of CNT or CB content is shown in FIG. 4. CNT50/CNT75 and carbon black formulations show almost similar flame retardancy. Flame retardancy increases with increase of content in CNT50, CNT75 and CB contained formulations.

From the results of FIGS. 2, 3 and 4, it is apparent that CNT50/CNT75 formulations show higher mechanical properties without losing flame retardancy compared with CB contained formulations. Therefore, CNT50/CNT75 can be used in HFFR formulations instead of CB for obtaining higher mechanical properties (elongation at break and tensile strength) and flame retardancy.

Figure 5:
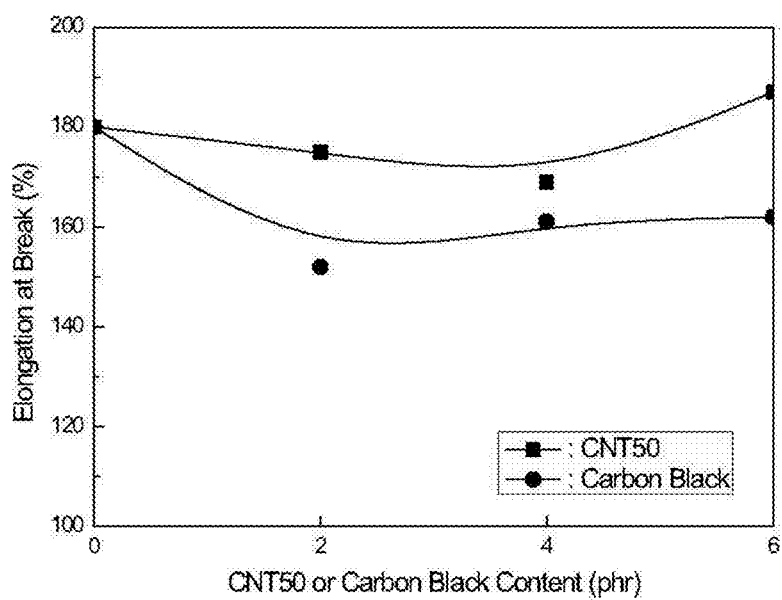
FIG. 5 illustrates elongation at break of ethylene vinyl acetate (Evaflex 360)/linear low density polyethylene (LLDPE 118W)/120 phr magnesium hydroxide (MAGNIFIN A Grades H10A) formulations as a function of CNT 50 or carbon black content.
Figure 6:
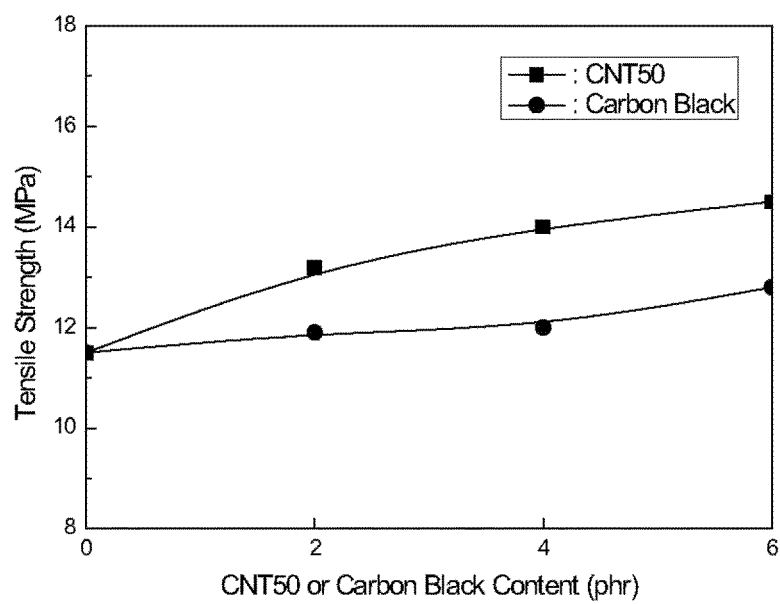
FIG. 6 illustrates tensile strength of ethylene vinyl acetate (Evaflex 360)/linear low density polyethylene (LLDPE 118W)/120 phr magnesium hydroxide (MAGNIFIN A Grades H10A) formulations as a function of CNT 50 or carbon black content.
Figure 7:
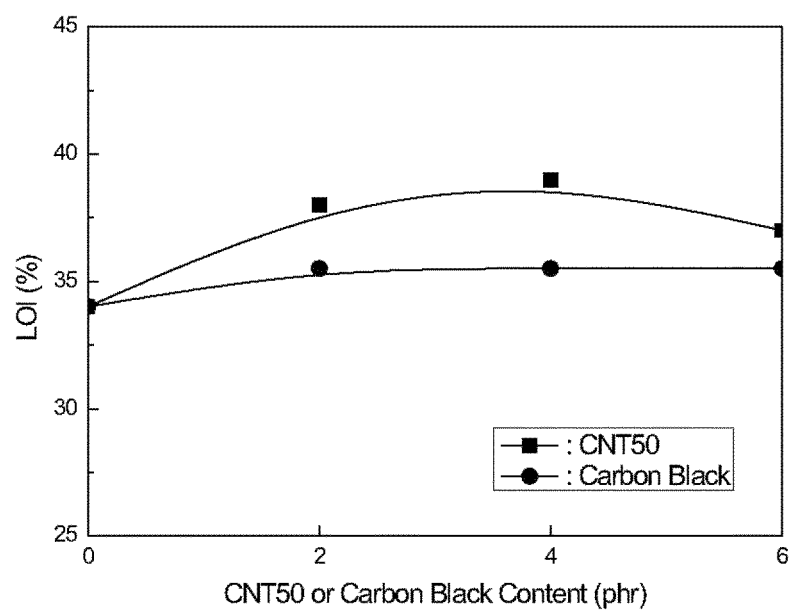
FIG. 7 illustrates LOI of ethylene vinyl acetate (Evaflex 360)/linear low density polyethylene (LLDPE 118W)/120 phr magnesium hydroxide (MAGNIFIN A Grades H10A) formulations as a function of CNT 50 or carbon black content.

For reconfirming the results of FIGS. 2, 3 and 4, the relationships between CNT50 and CB in EVA/LLDPE/MAGNIFIN A Grades H10A are investigated as shown in FIGS. 5, 6 and 7. LLDPE (20% weight content) is mixed with EVA to increase thermal properties. Elongation at break (%) of Evaflex 360/LLDPE 118W/120 phr H10A formulations as a function of CNT 50 or CB is shown in FIG. 5. It is apparently observed that CNT50 contained formulations show higher elongation at break values compared with CB contained formulations. Elongation at break slightly increases with increase of CNT50 content while elongation at break slightly decreases with increase of CB content.

Tensile strength of Evaflex 360/LLDPE 118W/120 phr H10A formulations as a function of CNT50 or CB content is shown in FIG. 6. It is apparently observed that CNT50 contained formulations show higher tensile strength values compared with CB contained formulations. Tensile strength increases with increase of CNT50 or CB. However, rate of increase of CNT50 contained formulations is higher than that of CB contained formulations. For both mechanical properties, higher values are obtained by CNT50 compared with CB.

LOI (%) of Evaflex 360/LLDPE 118W/120 phr H10A formulations as a function of CNT or CB content is shown in FIG. 4. Higher flame retardancy is observed by CNT50 contained formulations compared with CB contained formulations. Flame retardancy increases with increase of CNT50 or CB content. However, the rate of increase for CNT50 contained formulations is higher than that of CB contained formulations. The highest LOI is observed at 4 phr CNT50 contained formulations.

DETAILED DESCRIPTION

There are two types of clean flame retardant materials for wire and cable, i.e., thermoplastic (without cross-linking) and thermosetting (cross-linked). This invention relates to thermoplastic type clean flame retardant material for wire and cable. More particularly, this invention relates to black color thermoplastic clean flame retardant compositions for improving mechanical properties and flame retardancy. The invented clean flame retardant compositions may be particularly suitable for use in enhanced cable insulations meeting IEC 60502, BS 6724 and BS 7655 standards for thermoplastic compounds requirements.

This invention pertains to unique formulation and processing method of clean flame retardant material for wire and cable. The present invention may lead to improved mechanical properties, particularly tensile strength and elongation break without deteriorating flame retardancy.

Clean flame retardant compositions consist of 100 parts polymer (EVA (Ethylene Vinyl Acetate), EVA/polyethylene, EEA (Ethylene Ethyl Acrylate)/polyethylene or Ethylene Alpha Olefin/polyethylene) by weight and 100-150 parts inorganic flame retardant such as magnesium hydroxide, aluminum hydroxide and huntite hydromagnesite by weight, 2-20 parts intumescent flame retardant such as red phosphorus, zinc borate, and boric acid by weight, 0.5-1.5 parts antioxidant by weight. Based on particular application, additional coloring agent, weathering protection agent, processing aid, coupling agent, lubricant and thermal stabilizer may be added to the composition.

The polymer may be (by weight) under 50% of total compound in a clean flame retardant composition. In addition, the particle size of most flame retardants which are used in clean flame retardant compositions may be under 50 μm. The aforementioned particle size of the flame retardant exhibits better dispersion properties to obtain better mechanical properties. When the polymer and the flame retardants are mixed well in the compounding process results in a balanced arrangement of polymer and flame retardant to obtain better mechanical properties.

This invention pertains to special formulations with unique materials of clean flame retardant materials for wire and cable. The present invention leads to improved flame retardancy and mechanical properties, particularly maintaining elongation at break/tensile strength without deteriorating flame retardancy in black color thermoplastic type clean flame retardant compositions.

More particularly, this invention relates to formulations of black color thermoplastic clean flame retardant compositions which do not contain carbon black. As shown in Conventional examples, it is known that carbon black can increase flame retardancy however it may decreased mechanical properties specially elongation break in black color thermoplastic clean flame retardant compositions compared to the present invention. The current composition may pass V-0 of UL 94 test with satisfactory mechanical properties of minimum tensile strength 8.8 MPa and minimum elongation at break 125% based on IEC 60502 standards compared to Conventional examples.

Moreover, in most commercial situations, mechanical properties are always fluctuating after production of wire and cable. The extruding temperature can be changed by seasonal environmental conditions, speed and cable size are also changed by various specifications and client's demand. Therefore, mechanical properties of clean flame retardant compositions should show at least 20-30% higher than normal specification values. When the mechanical properties just meet the specification values, the quality control margin is very tight, accordingly, some products may fail specifications.

The main points for selecting the new material in this invention are as follows:
- The new material which can be used instead of carbon black to increase flame retardancy in thermoplastic clean flame retardant compositions.
- This material may exhibit an increase in mechanical properties, specially, elongation at break.
- This material must be compatible with the other flame retardant composition components.

Carbon nano tubes (CNT) is very compatible for this purpose. Other flame reartdant compositions that are compatible with CNT are magnesium hydroxide, huntite hydromagnesite, aluminum hydroxide, zinc borate, carbon black and etc. These components have very fine structure and are useful in flame retardant composition.

CNT is considered as allotrope of carbon with nanostructure whose length-to-diameter ratio is very long. These cylindrical carbon molecules have novel properties which make them potentially useful in many applications. It is suggested that allotropes may contribute to increase in flame retardancy in clean flame retardant compositions; nevertheless, mechanical properties of compositions are not deteriorated because CNT is constructed by nanostructure. This is the main reason to use CNT instead of carbon black in clean flame retardant composition in the current invention.

Several different types of CNT are investigated to find best compatibility with the other components in thermoplastic clean flame retardant compositions. CNT is categorized as single walled nanotube (SWNT), multi-walled nanotube (MWNT), fullerene structural, spherical buckyball type structural, different diameter sizes and tube lengths. In this invention, three multi-walled CNTs with different diameter sizes and tube lengths are investigated to find compatibility with the other components in thermoplastic clean flame retardant compositions. CM-95 (Hanwha nanotech/Korea, multi-walled CNT synthesized by catalytic CVD process, diameter range: 10-15 nm), CNT 50 (NanoKarbon, Korea nano Ind. Co., multi-walled CNT synthesized by catalytic CVD process, inner diameter: 10-30 nm, outer diameter: 40-60 nm, length distribution: under 20 μm) and CNT 75 (NanoKarbon, Korea nano Ind. Co., multi-walled carbon nanotubes synthesized by catalytic CVD process, inner diameter: 30-50 nm, outer diameter 60-80 nm, length distribution: under 20 μm) are investigated for finding better compatibility with the other components.

The following are an example of Conventional formulations that show results of clean flame retardant compositions in terms of mechanical properties and flame retardancy.

As shown in examples, three different types of flame retardants are investigated, such as MAGNIFIN A Grades H10A (magnesium hydroxide, formula: $Mg(OH)_2$ producer: Albemarle/France), Ultracarb LH 15× (huntite hydromagnesite, formula: $Mg_3Ca(CO_3)_4$, $Mg_5(CO_3)_4(OH)_2$ $3H_2O$, producer: Minelco/USA) and KISUMA 5B (magnesium hydroxide, formula: $Mg(OH)_2$, Producer: Kyowa Chemical/Japan). Evaflex 360 (ethylene vinyl acetate, producer: DuPont-Mitsui Polychemicals Co./Japan, vinyl acetate content: 25%, melt mass-flow rate (MFR) (190° C./2.16 kg): 2.0 g/10 min) and LLDPE 118 (melt flow index: 1.0 g/10 min, producer: SABIC/Saudi Arabia) are used as base polymers. Irganox 1010 (chemical name: pentaerythritol tetrakis(3(3,5-di tert-buty-4-hydroxyphenyl)propionate, CIBA specialty chemicals/Switzerland, melting range 110-125° C.) is used as antioxidant. Corax N550 (producer: Degussa, Germany, semi-active carbon black with high structure, ash content: 0.5%) is used as carbon black. All materials of experimental are summarized in Table 1.

TABLE 1

Materials list.

| Function/Chemical Name | Material | Producer | Characteristics |
|---|---|---|---|
| Polymer, ethylene vinyl acetate (EVA) | Evaflex 360 | DuPont-Mitsui Polychemicals Co./Japan | vinyl acetate content: 25%, melt mass-flow rate (MFR) (190° C./2.16 kg): 2.0 g/10 min |
| Polymer, linear low density polyethylene (LLDPE) | LLDPE 118 | SABIC/Saudi Arabia | melt flow index: 1.0 g/10 min |
| Flame retardant, magnesium hydroxide, formula: $Mg(OH)_2$ | MAGNIFIN A Grades H10A | Albemarle/France | |
| Flame retardant, huntite hydromagnesite, formula: $Mg_3Ca(CO_3)_4$, $Mg_5(CO_3)_4(OH)_2 3H_2O$ | Ultracarb LH 15X | Minelco/USA | |
| Flame retardant, magnesium hydroxide, formula: $Mg(OH)_2$ | KISUMA 5B | Kyowa Chemical/Japan | |
| Antioxidant, pentaerythritol tetrakis(3(3,5-di tert-buty-4-hydroxyphenyl)propionate, | Irganox 1010 | CIBA specialty chemicals/Switzerland | melting range: 110-125° C. |
| Carbon black | Corax N550 | Degussa/Germany | semi-active carbon black with high structure, ash content: 0.5% |
| Intumescent flame retardants, red phosphorus masterbatch | Exolit RP 692 | Clariant/France | phosphorus content: approx. 50% (w/w) |
| Intumescent flame retardants, zinc borate | Firebrake ZB | Borax/USA | |
| Intumescent flame retardants, Boric Acid | Boric Acid | Rose Mill Chemicals & Lubricant/USA | |
| Carbon nano tube | CM-95 | Hanwha nanotech/Korea | multi-walled CNT synthesized by catalytic CVD process, diameter ranges: 10-15 nm |
| Carbon nano tube | CNT 50 | NanoKarbon, Korea nano Ind. Co. | multi-walled CNT synthesized by catalytic CVD process, inner diameter: 10-30 nm, outer diameter: 40-60 nm, length distribution: under 20 μm |

TABLE 1-continued

Materials list.

| Function/Chemical Name | Material | Producer | Characteristics |
|---|---|---|---|
| Carbon nano tube | CNT 75 | NanoKarbon, Korea nano Ind. Co. | multi-walled CNT synthesized by catalytic CVD process, inner diameter: 30-50 nm, outer diameter: 60-80 nm, length distribution: under 20 μm |

The reason for using LDPE (or LLDPE) in base polymers is to increase thermal properties of thermoplastic clean flame retardant compositions. In general, high filler mixable polymers, such as ethylene vinyl acetate (EVA), ethylene ethyl acrylate (EEA) or ethylene alpha olefin have very low softening temperatures. Mostly, their softening points are under 100° C. Therefore, it is apparent that using only low softening temperature grade polymers without any high temperature grade polymers in base polymers will lead to loss in thermal properties. The thermal aging test condition of thermoplastic clean flame retardant material is 100° C. for 136 hours. To achieve appropriate thermal stability, the mixing of high temperature grade polymer such as polyethylene is required. Therefore, the base polymers in thermoplastic clean flame retardant compositions should have appropriate thermal stability to pass the thermal aging test (at 100° C. for 136 hours). However, polyethylene has low filler mix ability and lower flame retardancy, accordingly, ethylene vinyl acetate/polyethylene compounded base polymers can mix less volume of flame retardants and decrease flame retardancy compared to 100% ethylene vinyl acetate base polymer.

Mechanical properties (tensile strength and elongation at break) were measured using a universal testing machine Model 5543 from Instron, USA in accordance with ASTM D 638M with testing conditions: speed of 500 mm/minute at 25° C. LOI (Limiting Oxygen Index) is a simple method to evaluate the flame retardancy of the materials. LOI was performed using an apparatus of Fire Testing Technology limited (Incorporating Stanton Redcroft), UK in accordance with ISO 4589 and ASTM D 2863. LOI corresponds to the minimum percentage of oxygen needed for the combustion of specimens (80×10×1 mm) in an oxygen-nitrogen atmosphere. The other method to estimate the flame retardancy of the materials is UL 94 Flammability standard by Underwriters Laboratories, USA. UL 94 test was performed using a flammability chamber of CEAST Co., Italy, in accordance with ASTM D 635 for horizontal and ASTM D 3801 for vertical test positions. The standard classifies plastics according to how they burn in various orientations and thicknesses. From lowest (least flame-retardant) to highest (most flame-retardant), the classifications are shown in Table 2:

TABLE 2

Standard Classification of material based on their orientation and thickness

| Standard Classification | Description | Conditions allowed |
|---|---|---|
| HB | Slow burning on a horizontal specimen; burning rate <76 mm/min for thickness <3 mm | |
| V2 | Burning stops within 30 seconds on a vertical specimen | Drips of flaming particles are allowed |
| V1 | Burning stops within 30 seconds on a vertical specimen | No drips allowed |
| V0 | Burning stops within 10 seconds on a vertical specimen | No drips allowed |

CONVENTIONAL EXAMPLE 1

| Content/Property | C-1 | C-2 | C-3 | C-4 | C-5 |
|---|---|---|---|---|---|
| Ethylene vinyl acetate (Evaflex 360) | 80 | 80 | 80 | 80 | 80 |
| Linear low density polyethylene (LLDPE 118W) | 20 | 20 | 20 | 20 | 20 |
| Magnesium hydroxide (MAGNIFIN A Grades H10A) | 120 | 120 | 120 | 120 | 120 |
| Carbon black (Corax N550) | 0 | 2 | 4 | 6 | 8 |
| Pentaerythritol tetrakis(3(3,5-di tert-buty-4-hydroxyphenyl)propionate (Irganox1010) | 1 | 1 | 1 | 1 | 1 |
| Tensile strength (MPa) | 9 | 9 | 9.5 | 9.5 | 10 |
| Elongation at break (%) | 165 | 150 | 150 | 150 | 145 |
| LOI (%) | 31 | 33 | 34 | 37 | 39 |
| UL 94 test | H-B | H-B | H-B | H-B | H-B |

These formulations are basic thermoplastic clean flame retardant compositions which consist of one main flame retardant (magnesium hydroxide (MAGNIFIN A Grades H10A)) with various contents of carbon black (Corax N550). From the experimental results, it is found that elongation at break decreases slightly even though tensile strength and flame retardancy increase with increase of carbon black (Corax N550) content.

CONVENTIONAL EXAMPLE 2

| Content/Property | C-6 | C-7 | C-8 | C-9 | C-10 |
|---|---|---|---|---|---|
| Ethylene vinyl acetate (Evaflex 360) | 80 | 80 | 80 | 80 | 80 |
| Linear low density polyethylene (LLDPE 118W) | 20 | 20 | 20 | 20 | 20 |
| Huntite hydromagnesite (Ultracarb LH 15X) | 120 | 120 | 120 | 120 | 120 |
| Carbon black (Corax N550) | 0 | 2 | 4 | 6 | 8 |
| Pentaerythritol tetrakis(3(3,5-di tert-buty-4-hydroxyphenyl)propionate (Irganox1010) | 1 | 1 | 1 | 1 | 1 |
| Tensile strength (MPa) | 7 | 7 | 8 | 9 | 9 |
| Elongation at break (%) | 160 | 145 | 140 | 130 | 130 |
| LOI (%) | 27 | 32 | 34 | 35 | 37 |
| UL 94 test | H-B | H-B | H-B | H-B | H-B |

Similar to Conventional Example 1, these formulations are also basic thermoplastic clean flame retardant compositions with various contents of carbon black (Corax N550), and the main flame retardant is changed from magnesium hydroxide (MAGNIFIN A Grades H10A) to huntite hydromagnesite (Ultracarb LH 15×). From the experimental results, similar tendency is observed, i.e. it is found that elongation at break decreases slightly even though tensile strength and flame retardancy increase with increase of carbon black (Corax N550) content.

CONVENTIONAL EXAMPLE 3

| Content/Property | C-11 | C-12 | C-13 | C-14 | C-15 |
|---|---|---|---|---|---|
| Ethylene vinyl acetate (Evaflex 360) | 80 | 80 | 80 | 80 | 80 |
| Linear low density polyethylene (LLDPE 118W) | 20 | 20 | 20 | 20 | 20 |
| Magnesium hydroxide (KISUMA 5B) | 120 | 120 | 120 | 120 | 120 |
| Carbon black (Corax N550) | 0 | 2 | 4 | 6 | 8 |
| Pentaerythritol tetrakis(3(3,5-di tert-buty-4-hydroxyphenyl)propionate (Irganox1010) | 1 | 1 | 1 | 1 | 1 |
| Tensile strength (MPa) | 10 | 9.5 | 9.5 | 9.5 | 9.5 |
| Elongation at break (%) | 550 | 500 | 480 | 450 | 420 |
| LOI (%) | 27 | 31 | 32 | 32 | 35 |
| UL 94 test | H-B | H-B | H-B | H-B | H-B |

As shown in Conventional example 3, not much change in tensile strength is observed with increase of carbon black content. On the contrary, influence of carbon black on elongation at break is quite prominent. Elongation at break decreases with increase of carbon content. Normally, increase of filler content may cause decrease in mechanical properties. Carbon black plays the role of filler in compounds; however under 8 phr of carbon black content by weight, the tensile strength remains almost constant while elongation at break is greatly influenced. In addition, it is apparent that LOI (%) increases with increase of carbon black content. From our experimental, it is definite that carbon black increases flame retardancy and decreases elongation at break in black color thermoplastic clean flame retardant compositions.

In Conventional examples 1, 2 and 3, no composition passes V-0 of UL 94 test with satisfactory mechanical properties of minimum tensile strength 8.8 MPa and minimum elongation at break 125% based on IEC 60502 standards. To pass V-0 of UL 94 test, higher than 120 phr content of main flame retardant with secondary (intumescent) flame retardants such as red phosphorus, zinc borate, and (or) boric acid has to be compounded. However, additional main and intumescent flame retardants can cause deterioration of mechanical properties in spite of improvement in flame retardancy as shown in Conventional example 4. Exolit RP 692 (red phosphorus master batch, producer: Clariant/France, phosphorus content: approx. 50% (w/w)), Firebrake ZB (zinc borate, producer: Borax/USA) and Boric Acid (Producer: Rose Mill Chemicals & Lubricant/USA) are used as intumescent flame retardants. Formulations of C-17 to C-20 which contain carbon black show big drop in elongation at break in spite of high LOI values. Many scientists are eager to find a substitute material for carbon black, which does not deteriorate mechanical properties with improved flame retardancy in thermoplastic clean flame retardant compositions. In our invention, new material which can substitute carbon black in thermoplastic clean flame retardant compositions for this particular purpose is introduced.

CONVENTIONAL EXAMPLE 4

| Content/Property | C-16 | C-17 | C-18 | C-19 | C-20 |
|---|---|---|---|---|---|
| Ethylene vinyl acetate (Evaflex 360) | 80 | 80 | 80 | 80 | 80 |
| Linear low density polyethylene (LLDPE 118W) | 20 | 20 | 20 | 20 | 20 |
| Magnesium hydroxide (MAGNIFIN A Grades H10A) | 130 | 130 | 130 | 130 | 130 |
| Red Phosphorus (RP-692) | 5 | 5 | 5 | 5 | 5 |
| Zinc Borate (Firebrake ZB) | 5 | 5 | 5 | 5 | 5 |
| Boric Acid | 2 | 2 | 2 | 2 | 2 |
| Carbon black (Corax N550) | 0 | 2 | 4 | 6 | 8 |
| Pentaerythritol tetrakis(3(3,5-di tert-buty-4-hydroxyphenyl)propionate (Irganox1010) | 1 | 1 | 1 | 1 | 1 |
| Tensile strength (MPa) | 10 | 9.5 | 10 | 10 | 10 |
| Elongation at break (%) | 150 | 130 | 115 | 105 | 100 |
| LOI (%) | 34 | 35 | 37 | 38 | 40 |
| UL 94 test | V-0 | V-0 | V-0 | V-0 | V-0 |

In the current invention, clean flame retardant compositions consist of 100 parts polymer (EVA (Ethylene Vinyl Acetate), EVA/polyethylene, EEA (Ethylene Ethyl Acrylate)/polyethylene or Ethylene Alpha Olefin/polyethylene) by weight and 100-150 parts inorganic flame retardants such as magnesium hydroxide, aluminum hydroxide and huntite hydromagnesite by weight, 2-20 parts intumescent flame retardants such as red phosphorus, zinc borate, and boric acid by weight, 0.5-1.5 parts antioxidants by weight. Based on particular application, additional coloring agent, weathering protection agent, processing aid, coupling agent, lubricant and thermal stabilizer are added to the compositions.

In the current invention the polymer portion (by weight) is under 50% total compound in clean flame retardant compositions. In addition, the particle size of most flame retardants which are used in clean flame retardant compositions are under 50 μm. Excellent dispersion of polymer/flame retardants is very important to obtain better mechanical properties. When polymer/flame retardants are well mixed in compounding process, it is assumed that the arrangement of polymer and flame retardants is very well balanced. The invention specially takes several aspects of improvements into consideration, such as improving mechanical property and arrangement of polymers containing flame retardants in a highly filled composition.

The current invention pertains to special formulations with unique materials of clean flame retardant materials for wire and cable. The present invention leads to improved flame retardancy and mechanical properties, particularly maintaining elongation at break/tensile strength without deteriorating flame retardancy in black color thermoplastic type clean flame retardant compositions.

More particularly, this invention relates to formulations of black color thermoplastic clean flame retardant compositions which do not contain carbon black which is generally used in ordinary black color clean flame retardant compositions at present. As shown in Conventional example 1, 2, and 3, it is known that carbon black can increase flame retardancy however it deteriorates mechanical properties specially elongation at break in black color thermoplastic clean flame retardant compositions. Therefore, it is very difficult to obtain satisfactory compositions which meet both main property standards such as flame retardancy and mechanical properties. It is hard to obtain suitable formulations which pass V-0 of UL 94 test with satisfactory mechanical properties of minimum tensile strength 8.8 MPa and minimum elongation at break 125% based on IEC 60502 standards in Conventional examples 1, 2 and 3.

Moreover, in most commercial situations, mechanical properties are always fluctuating after production of wire and cable. The extruding temperature, speed and cable size varies depending on environmental conditions, client requirements and standard specifications. Therefore, mechanical properties of clean flame retardant compositions should show at least 20-30% higher than normal specification values in order to pass the stringent quality control tests.

In our invention, for solving deterioration of mechanical properties while maintaining high flame retardancy in black color thermoplastic clean flame retardant compositions, new material is introduced instead of carbon black.

As shown in FIG. 1, it is observed that CM-95 has much smaller diameter size and much higher length-to-diameter ratio compared to CNT 50 and CNT 75.

As preliminary test, the relationships between MAGNIFIN A Grades H10A and CNT/carbon black are investigated as shown in pre-test examples. In pre-test examples, only Evaflex 360 is used as base matrix polymer. The relationships between elongation at break/CNT (or carbon black content), tensile strength/CNT (or carbon black content) and flame retardancy/CNT (or carbon black content) are shown in FIGS. 2-4.

PRE-TEST EXAMPLE 1

| Content/Property | P-1 | P-2 | P-3 | P-4 |
| --- | --- | --- | --- | --- |
| Ethylene vinyl acetate (Evaflex 360) | 100 | 100 | 100 | 100 |
| Magnesium hydroxide (MAGNIFIN A Grades H10A) | 120 | 120 | 120 | 120 |
| Carbon black (Corax N550) | 0 | 2 | 4 | 6 |
| Pentaerythritol tetrakis(3(3,5-di tert-buty-4-hydroxyphenyl)propionate (Irganox1010) | 1 | 1 | 1 | 1 |
| Tensile strength (MPa) | 10 | 9.3 | 9.5 | 10.8 |
| Elongation at break (%) | 200 | 175 | 150 | 180 |
| LOI (%) | 33 | 35 | 36.5 | 39 |

PRE-TEST EXAMPLE 2

| Content/Property | P-5 | P-6 | P-7 | P-8 |
| --- | --- | --- | --- | --- |
| Ethylene vinyl acetate (Evaflex 360) | 100 | 100 | 100 | 100 |
| Magnesium hydroxide (MAGNIFIN A Grades H10A) | 120 | 120 | 120 | 120 |
| CM-95 (Outer D. = 10-15 nm) | 0 | 2 | 4 | 6 |
| Irganox 1010 | 1 | 1 | 1 | 1 |
| Tensile strength (MPa) | 10.3 | 11.6 | 12.0 | 12.7 |
| Elongation at break (%) | 200 | 165 | 133 | 135 |
| LOI (%) | 33 | 31.5 | 31.5 | 31.5 |

PRE-TEST EXAMPLE 3

| Content/Property | P-9 | P-10 | P-11 | P-12 |
| --- | --- | --- | --- | --- |
| Ethylene vinyl acetate (Evaflex 360) | 100 | 100 | 100 | 100 |
| Magnesium hydroxide (MAGNIFIN A Grades H10A) | 120 | 120 | 120 | 120 |
| Carbon nano tube (CNT50) (Outer D = 40-60 nm) | 0 | 2 | 4 | 6 |
| Pentaerythritol tetrakis(3(3,5-di tert-buty-4-hydroxyphenyl)propionate (Irganox1010) | 1 | 1 | 1 | 1 |
| Tensile strength (MPa) | 10.3 | 11.3 | 11.5 | 12.0 |
| Elongation at break (%) | 200 | 200 | 180 | 185 |
| LOI (%) | 33 | 34.5 | 36.5 | 40.5 |

PRE-TEST EXAMPLE 4

| Content/Property | P-13 | P-14 | P-15 | P-16 |
| --- | --- | --- | --- | --- |
| Ethylene vinyl acetate (Evaflex 360) | 100 | 100 | 100 | 100 |
| Magnesium hydroxide (MAGNIFIN A Grades H10A) | 120 | 120 | 120 | 120 |

-continued

| Content/Property | P-13 | P-14 | P-15 | P-16 |
|---|---|---|---|---|
| Carbon nano tube (CNT75) (Outer D. = 60-80 nm) | 0 | 2 | 4 | 6 |
| Pentaerythritol tetrakis(3(3,5-di tert-buty-4-hydroxyphenyl)propionate (Irganox1010) | 1 | 1 | 1 | 1 |
| Tensile strength (MPa) | 10.3 | 10.7 | 10.3 | 11.8 |
| Elongation at break (%) | 200 | 190 | 165 | 190 |
| LOI (%) | 33 | 35.5 | 36.5 | 40 |

Elongation at break and tensile strength of EVA/120 phr H10A formulations as a function of CNT or carbon black content are shown in FIGS. 2 and 3. Surprisingly, different trends are demonstrated by different CNTs even though the content is the same and is quite small. At the range of up to 4 phr content, elongation at break decreases and tensile strength increases with increase of CNT content. It is interesting to notice that CM-95 contained formulations show the lowest elongation at break and the highest tensile strength among all investigated formulations including carbon black contained formulations. It is observed that smaller particle size shows higher tensile strength, therefore, CM-95 shows the highest tensile strength and carbon black shows the lowest tensile strength. It is considered that mechanical properties depend mainly upon the size of particles.

As shown in FIG. 4, CNT50, CNT75 and carbon black formulations show almost similar trends of flame retardancy as a function of content, on the contrary, CM-95 formulation shows very low flame retardancy. Flame retardancy increases with increase of content in CNT50, CNT75 and carbon black formulations. Flame retardancy increases with as low as 2 phr of CNT50, CNT75 or carbon black by weight. It is observed that these materials have strong influence on flame retardancy in combination with magnesium hydroxide (MAGNIFIN A Grades H10A) except in the case of CM-95. It is considered that the size of diameter and the length of tube influence mechanical properties and flame retardancy. Namely, CM-95 has too small diameter with too long length which leads to poor compatibility with the other components, consequently CM-95 formulations show poor results of mechanical properties and flame retardancy.

From the results of mechanical properties and flame retardancy, CNT50 contained formulations show the best results in both properties. When only CNT50 formulations and carbon black formulations are compared in terms of mechanical properties (i.e. elongation at break and tensile strength), it is apparent that CNT50 contained formulations show much higher properties than carbon black formulations. Accordingly, it is considered that CNT50 has proper size and length for use in clean flame retardant compositions. Namely, CNT of outer diameter of 40-60 nm and length distribution of under 20 μm can be used in thermoplastic clean flame retardant compositions instead of carbon black to increase mechanical properties and flame retardancy. Therefore, CNT 50 is selected for detailed comparative investigation with carbon black.

The following non-limiting examples illustrate formulations of the invented compositions.

EXAMPLE 1

| Content/Property | 1 | 2 | 3 | 4 |
|---|---|---|---|---|
| Ethylene vinyl acetate (Evaflex 360) | 80 | 80 | 80 | 80 |
| Linear low density polyethylene (LLDPE 118W) | 20 | 20 | 20 | 20 |
| Magnesium hydroxide (MAGNIFIN A Grades H10A) | 120 | 120 | 120 | 120 |
| Carbon black (Corax N550) | — | — | — | — |
| Carbon nano tube (CNT50) (Outer D = 40-60 nm) | 0 | 2 | 4 | 6 |
| Pentaerythritol tetrakis (3(3,5-ditert-buty-4-hydroxyphenyl) propionate (Irganox1010) | 1 | 1 | 1 | 1 |
| Tensile strength (MPa) | 12 | 13 | 14 | 14 |
| Elongation at break (%) | 180 | 175 | 170 | 170 |
| Thermal aging at 100° C. for 168 hrs — Retention of tensile strength (%) | Over 80% | | | |
| Retention of elongation at break (%) | Over 80% | | | |
| LOI (%) | 34 | 38 | 39 | 39 |
| UL 94 test | H-B | H-B | H-B | V-2 |
| Volume resistivity(Ωcm) | $4 \times 10^{15}$ | $2 \times 10^{15}$ | $2 \times 10^{15}$ | $1 \times 10^{15}$ |

Volume resistivity is measured at room temperature (25° C.) in accordance with ASTM D257 using high resistance meter of Model HP4339B, HP, USA. From the results, it is observed that even the highest CNT50 content (6 phr (per hundred resin)) by weight formulation (run No. 4) shows very high volume resistivity (Ω·cm). Therefore, it is apparent that CNT50 contained formulations that are suitable to be used in cable insulation materials.

As shown in FIGS. 5 and 6, it is observed that CNT50 formulations show higher mechanical properties compared to carbon black formulations. Elongation at break slightly increases with increase of CNT50 content while elongation at break slightly decreases with increase of carbon black content. In addition, tensile strength increases with increase of CNT50 or carbon black, however the rate of increase for CNT50 content is higher than that of carbon black content. Namely, higher values are obtained by CNT50 compared to carbon black for both mechanical properties. These results show that CNT50 may be very suitable flame retardant in thermoplastic clean flame retardant compositions if the same or higher flame retardancy is achieved with CNT50.

As shown in FIG. 7, surprisingly, higher flame retardancy is observed by CNT50 formulations compared to carbon black formulations. Flame retardancy increases with increase of CNT50 or carbon black content. However, the rate of increase for CNT50 formulations is higher than that of carbon black formulations.

In addition, volume resistivity (Ω·cm) of CNT 50 and carbon black formulations is over $1 \times 10^{15}$ Ω·cm which is sufficient for use in wire and cable insulation and jacket materials.

From the overall results of mechanical properties, flame retardancy and electrical properties for CNT 50/carbon black formulations, CNT50 is really a suitable material which can be used instead of carbon black in thermoplastic clean flame retardant compositions.

The main key points of this invention are re-confirmed from above experimental. Namely, CNT of outer diameter of 40-60 nm and length distribution of under 20 μm can be used in thermoplastic clean flame retardant compositions instead of carbon black to improve mechanical properties and flame retardancy.

The compounding of above compositions is preferably conducted as follows, namely, EVA and LDPE are melted and mixed in internal mixer for four minutes at 150° C. Then, rest of additives and flame retardants are mixed with already melted polymers for 10 minutes at 150° C. The pre-mixed compounds are moved to two roll mill/guider cutter/pelletizing extruder and then pelletized. At this step, temperature of two roll mixer is kept around 150° C. and mixture is processed for 5-10 minutes.

Another important processing parameter for clean flame retardant materials compared to routine thermoplastics is that the extruding temperature of clean flame retardant materials is 160° C.-200° C. while that of routine thermoplastics is 200-250° C. The extruding temperature of clean flame retardant materials is lower than routine thermoplastics such as polyethylene because clean flame retardant materials are mainly consisted of low softening temperature grade polymers such as EVA (Ethylene Vinyl Acetate), Ethylene Alpha Olefin or Ethylene Ethyl Acrylate.

Sheets of test specimen for mechanical properties and flame retardancy are prepared by hot press and compressed at 180° C. for 10 minutes with thickness of 2 mm Likewise, the above materials are preferably extruded at temperature 160° C.-200° C. onto conductors to prepare the insulated cable and check process ability. This extruding process is exactly the same as routine thermoplastic method. During cable extrusion of above compositions, non CNT 50 content composition (run number 1) and 2-4 parts CNT 50 per hundred resin by weight (run numbers 2 and 3) show the best process ability and excellent surface smoothness of finished cables.

Similar to Example 1, ethylene vinyl acetate (Evaflex 360)/magnesium hydroxide (KISUMA 5B) (120 phr)/CNT 50 formulations are conducted. The detailed examples of formulations are shown in EXAMPLE 2. As shown in results for ethylene vinyl acetate (Evaflex 360)/magnesium hydroxide (MAGNIFIN A Grades H10A) (120 phr) formulations, 2-4 parts CNT 50 per hundred resin by weight show the best performance. Non CNT 50 content composition (run number 5) and 2-4 parts CNT 50 per hundred resin by weight (run numbers 6 and 7) show the best process ability and excellent surface smoothness of finished cables.

EXAMPLE 2

| Content/Property | 5 | 6 | 7 | 8 |
|---|---|---|---|---|
| Ethylene vinyl acetate (Evaflex 360) | 80 | 80 | 80 | 80 |
| Linear low density polyethylene (LLDPE 118W) | 20 | 20 | 20 | 20 |
| Magnesium hydroxide (KISUMA 5B) | 120 | 120 | 120 | 120 |
| Carbon nano tube (CNT50) (Outer D = 40-60 nm) | 0 | 2 | 4 | 6 |
| Pentaerythritol tetrakis (3(3,5-di tert-buty-4-hydroxyphenyl) propionate (Irganox1010) | 1 | 1 | 1 | 1 |
| Room temperature Tensile strength (MPa) | 10 | 10 | 10 | 10 |
| Elongation at break (%) | 550 | 500 | 450 | 440 |
| Thermal aging at 100° C. for 168 hrs Retention of tensile strength (%) | Over 80% | | | |
| Retention of elongation at break (%) | Over 80% | | | |
| LOI (%) | 27 | 30 | 33 | 35 |
| UL 94 test | H-B | H-B | H-B | V-2 |
| Volume resistivity(Ωcm) | $3 \times 10^{15}$ | $3 \times 10^{15}$ | $1 \times 10^{15}$ | $1 \times 10^{15}$ |

To increase flame retardancy and achieve V-0 of UL94 test, intumescent flame retardants such as Exolit RP 692 (red phosphorus masterbatch, producer: Clariant/France, phosphorus content: approx. 50% (w/w)), Firebrake ZB (zinc borate, producer: Borax/USA) and Boric Acid (Producer: Rose Mill Chemicals & Lubricant/USA) are used in ethylene vinyl acetate (Evaflex 360)/magnesium hydroxide (MAGNIFIN A Grades H10A) (120 phr) formulations as shown in EXAMPLE 3. Processing of test specimen and cable extrusion is the same as previous methods.

From the results, it is found that 2-4 parts CNT 50 per hundred resin by weight (run numbers 10 and 11) compositions show excellent mechanical properties and flame retardancy. Specially, all compositions meet V-0 of UL94 test and volume resistivity (Ω·cm) is sufficient for use in wire and cable insulation materials. Elongation at break of run numbers 10 and 11 decreases slightly at CNT 50 content of 2-4 parts per hundred resin by weight. If carbon black is used in run numbers 10 and 11 instead of CNT 50, elongation at break is greatly decreased as shown in Conventional EXAMPLE 3. In addition, all compositions show excellent thermal properties by passing thermal aging test (100° C.×136 hrs).

Non CNT 50 content composition (run number 9) and 2-4 parts CNT 50 per hundred resin by weight (run numbers 10 and 11) compositions show the best process ability and excellent surface smoothness for finished cables.

EXAMPLE 3

| Content/Property | 9 | 10 | 11 | 12 |
|---|---|---|---|---|
| Ethylene vinyl acetate (Evaflex 360) | 80 | 80 | 80 | 80 |
| Linear low density polyethylene (LLDPE 118W) | 20 | 20 | 20 | 20 |
| Magnesium hydroxide (MAGNIFIN A Grades H10A) | 130 | 130 | 130 | 130 |

-continued

| Content/Property | | 9 | 10 | 11 | 12 |
|---|---|---|---|---|---|
| Red phosphorus (RP-692) | | 5 | 5 | 5 | 5 |
| Zinc borate (Firebrake ZB) | | 5 | 5 | 5 | 5 |
| Boric acid | | 2 | 2 | 2 | 2 |
| Carbon nano tube (CNT50) (Outer D = 40-60 nm) | | 0 | 2 | 4 | 6 |
| Pentaerythritol tetrakis (3(3,5-di tert-buty-4-hydroxyphenyl) propionate (Irganox1010) | | 1 | 1 | 1 | 1 |
| Room temperature | Tensile strength (MPa) | 10 | 11 | 11 | 11.5 |
| | Elongation at break (%) | 150 | 145 | 145 | 140 |
| Thermal aging at 100° C. for 168 hrs | Retention of tensile strength (%) | Over 80% | | | |
| | Retention of elongation at break (%) | Over 80% | | | |
| LOI (%) | | 34 | 36 | 38 | 39 |
| UL 94 test | | V-0 | V-0 | V-0 | V-0 |
| Volume resistivity(Ωcm) | | $2 \times 10^{15}$ | $1 \times 10^{15}$ | $2 \times 10^{15}$ | $9 \times 10^{14}$ |

Although the present embodiments have been described with reference to specific example embodiments, it will be evident that various modifications and changes may be made to these embodiments without departing from the broader spirit and scope of the various embodiments. Accordingly, the specification and examples are to be regarded in an descriptive rather than a restrictive sense.

What is claimed is:

1. A method of mixing a thermoplastic composition, comprising:
   melting a composition comprising an ethylene vinyl acetate polymer 100 parts by weight, and a polyethylene polymer 20 parts by weight for 10 minutes at 150° C.;
   adding the followings to the composition as a mixture, an inorganic flame retardant 50-250 parts by weight, an intumescent flame retardant 0-100 parts by weight, an antioxidant 0.1-1.5 parts by weight, a processing aid 1-10 parts, and a carbon nano tube 1-6 parts by weight; and mixing for 10 minutes at 150° C.

2. A method according to claim 1 further comprising adding 2-6 parts by weight of the carbon nano tube.

3. A method of claim 1 further comprising:
   extruding the thermoplastic extrudable composition without post curing.

4. A method of claim 3 further comprising:
   maintaining an extruding temperature between 160°-200° C.

* * * * *